United States Patent
Srinivasan et al.

(10) Patent No.: US 9,436,712 B2
(45) Date of Patent: Sep. 6, 2016

(54) DATA MIGRATION FRAMEWORK

(71) Applicant: Microsoft Technology Licensing, LLC, Redmond, WA (US)

(72) Inventors: Sri Srinivasan, Sammamish, WA (US); Mudit Mittal, Bellevue, WA (US); Tao Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 13/914,633

(22) Filed: Jun. 11, 2013

(65) Prior Publication Data

US 2014/0279890 A1    Sep. 18, 2014

Related U.S. Application Data

(60) Provisional application No. 61/783,767, filed on Mar. 14, 2013.

(51) Int. Cl.
*G06F 17/30* (2006.01)

(52) U.S. Cl.
CPC ....... *G06F 17/303* (2013.01); *G06F 17/30563* (2013.01); *G06F 17/30575* (2013.01)

(58) Field of Classification Search
CPC . G06F 17/30; G06F 17/303; G06F 17/30563
USPC ...... 707/694, 999.101, 609, 626, 806, 999.2
See application file for complete search history.

(56) References Cited

U.S. PATENT DOCUMENTS

| | | | |
|---|---|---|---|
| 7,831,568 B2 | 11/2010 | Sattler et al. | |
| 8,131,686 B2 | 3/2012 | Lakshmanachar et al. | |
| 2005/0240569 A1* | 10/2005 | Cheng | G06F 17/30545 |
| 2008/0140692 A1 | 6/2008 | Gehring | |
| 2008/0243884 A1 | 10/2008 | Mehta | |
| 2008/0255895 A1* | 10/2008 | Rajamony et al. | 705/7 |
| 2008/0270369 A1 | 10/2008 | Myerson et al. | |
| 2009/0119476 A1* | 5/2009 | Jernigan et al. | 711/204 |
| 2009/0281847 A1* | 11/2009 | Hamilton et al. | 705/7 |
| 2011/0060719 A1 | 3/2011 | Kapoor | |
| 2012/0221684 A1 | 8/2012 | Ferris | |
| 2015/0347540 A1* | 12/2015 | Singh | G06F 17/30371 707/602 |

FOREIGN PATENT DOCUMENTS

GB    2448076    10/2008

OTHER PUBLICATIONS

"Extract, transform, load" Retrieved from Wikipedia, the free encyclopedia, Retrieved at <<http://www.wayback.archive.org/web/20130109062117/http://en.wikipedia.org/wiki/Extract._transform._load>>on May 28, 2014, pp. 11.
Search report and the Written Opinion dated Jun. 20, 2014, International application No. PCT/US2014/022897.

(Continued)

*Primary Examiner* — Robert Beausoliel, Jr.
*Assistant Examiner* — Pedro J Santos
(74) *Attorney, Agent, or Firm* — Thomas Marquis; Kate Drakos; Micky Minhas

(57) ABSTRACT

User data is retrieved from an instance of a data system. A mapping between the data system and one or more staging tables is generated and a package that includes the data and the mapping is generated. The user data is saved to the one or more staging tables using the mapping.

18 Claims, 12 Drawing Sheets

(56) References Cited

OTHER PUBLICATIONS

"Introduction to the Data Migration Framework (DMF) in Microsoft Dynamics", Retrieved at <<http://junctionsolutions.com/blogjuice/wp-content/uploads/2012/11/Introduction-to-the-Data-Migration-Framework.pdf>> In the Proceedings of White Paper, Nov. 2012, pp. 21.

"Framework for Data Migration in SAP Environments", Retrieved at <<http://www.affecto.dk/content/download/7034/66397/version/1/file/Affecto+SAP+Migration+Framework.pdf>> Retrieved Date: Mar. 13, 2013, pp. 5.

Krishna, et al., "A Unified and Scalable Data Migration Service for the Cloud Environments", Retrieved at <<http://www.cse.iitb.ac.in/~comad/2009/proceedings/D1.pdf>> In the proceedings of in 15th International Conference on Management of Data, Dec. 9, 2009, pp. 4.

Hajjat, et al., "Cloudward Bound: Planning for Beneficial Migration of Enterprise Applications to the Cloud", Retrieved at <<http://research.microsoft.com/pubs/132805/cloudwardbound-sigcomm2010.pdf>> In the proceedings of the in SIGCOMM Conference, Aug. 30, 2010, pp. 12.

"Statement of Direction: Product Strategy and Roadmap for Microsoft Dynamics AX", Retrieved at <<http://www.greenbeacon.com/GreenBeaconWebsite/Libraries/Resources/Brochure_-_MSAX_2012_StatementofDirection_-_Aug2012.sflb.ashx>> Aug. 2012, pp. 18.

"Data Import/Export Framework User Guide [AX 2012]", Retrieved at <<http://technet.microsoft.com/en-us/library/jj225591.aspx>> Mar. 2013, pp. 5.

"Install the Data Import\Export Framework [AX 2012]", Retrieved at <<http://technet.microsoft.com/en-us/library/jj225595.aspx>> Mar. 8, 2013, pp. 9.

"Microsoft Dynamics CRM 4.0 Data Migration Manager", Retrieved at <<http://www.microsoft.com/en-us/download/details.aspx?id=15311>> Retrieved Date: Mar. 13, 2013, pp. 2.

"Connectivity Studio", Retrieved at <<http://www.to-increase.com/en/Solutions/Microsoft_Dynamics_AX/Business_Integration_Solutions/Connectivity_Studio.aspx Retrieved Date: Mar. 13, 2013, pp. 9.

"Second Written Opinion Issued in PCT Patent Application No. PCT/US2014/022897", Mailed Date: Feb. 26, 2015, 9 pages.

Bernstein, et al. "Generic Schema Matching, Ten years Later", In Proceedings of the VLDB Endowment, vol. 4, No. 11, Aug. 2011, pp. 695-701.

"International Preliminary Report on Patentability Issued in PCT Application No. PCT/US2014/022897", Mailed Date: Jun. 25, 2015, 9 pages.

\* cited by examiner

DATA MIGRATION FRAMEWORK

The present application is based on and claims the benefit of U.S. provisional patent application Ser. No. 61/783,767, filed Mar. 14, 2013, the content of which is hereby incorporated by reference in its entirety.

BACKGROUND

Data systems are currently in wide use. However, as an organization grows or changes, it may wish to switch from one data system that is currently deployed, to another data system. Migrating the company's data from one data system to another data system can be quite complex, and difficult.

In one specific example, business data systems are used by many organizations in order to perform business operations. Business data systems can include, for example, enterprise resource planning (ERP) systems, customer relations management (CRM) systems, and line-of-business (LOB) systems, and other business data systems.

As a company grows or changes, it is not uncommon for a company or organization to wish to change from using one business data system, to using another business data system. This can be difficult. For instance, the formats of the two business data systems might be different. In such a case, it can be difficult to accurately transfer data from the source business data system to the target business data system. If records in the source business data system are saved according to a format that is different from those in the target business data system, data can be inaccurately moved from one system to the other, and data can even be lost.

In addition, it may be that a company is simply using a database to retain its business data. The company may then wish to migrate the data from the database to a business data system. In that case, the source of the business data is not even a business data system, but it is instead simply a database. This can exacerbate the problems associated with data migration.

The discussion above is merely provided for general background information and is not intended to be used as an aid in determining the scope of the claimed subject matter.

SUMMARY

User data is retrieved from an instance of a data system. A mapping between the data system and one or more staging tables is generated and a package that includes the data and the mapping is generated. The user data is saved to the one or more staging tables using the mapping.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
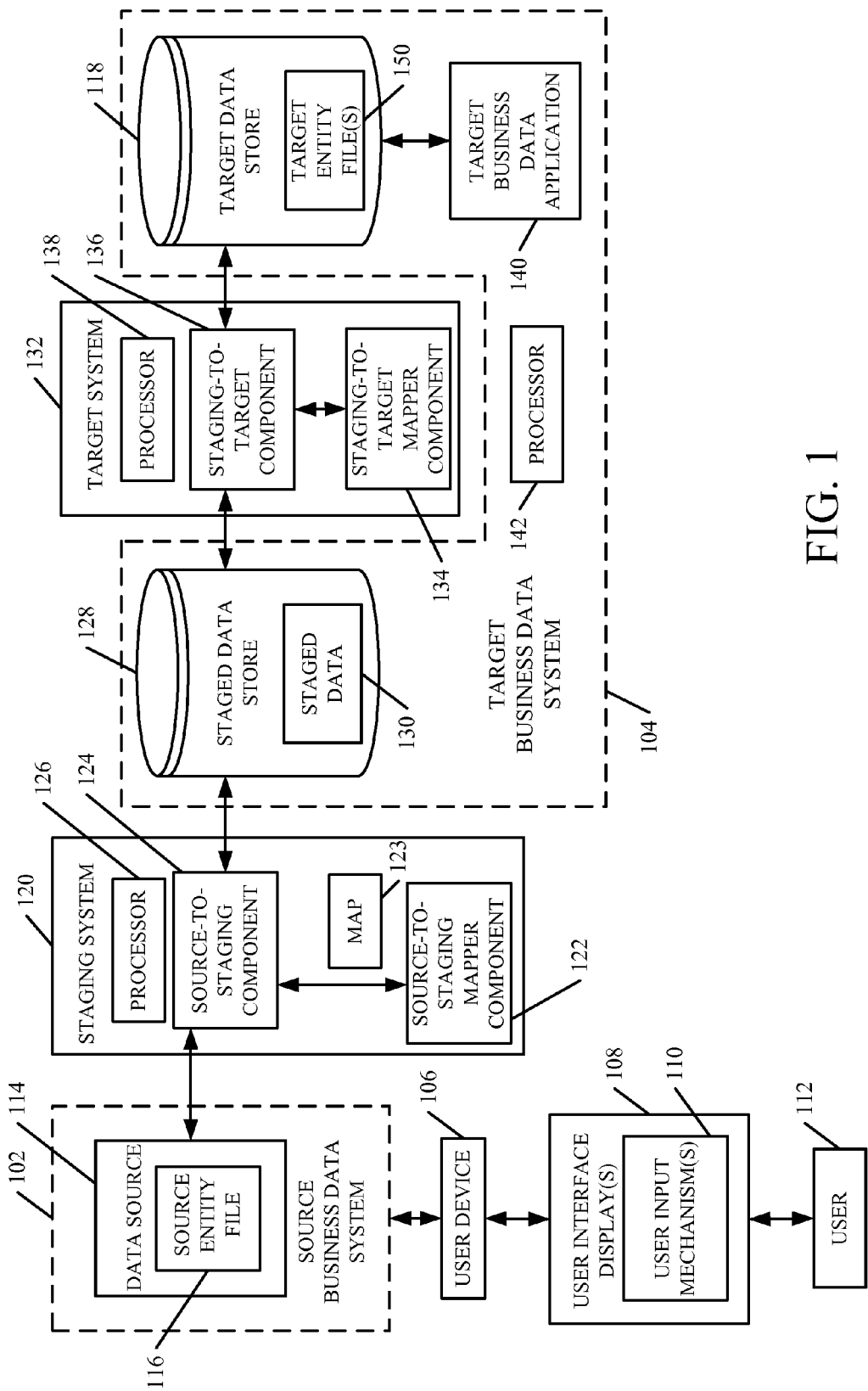
FIG. 1 is a block diagram of one embodiment of a data migration architecture.

FIG. 1 shows one embodiment of architecture 100 for migrating data from a source business data system 102 to a target business data system 104. In the embodiment described herein, both source business data system 102 and target business data system 104 will be described as enterprise resource planning (ERP) systems. However, it will be noted that they can be any of a wide variety of other data systems as well, but they are described herein as business data systems (and specifically ERP systems) for the sake of example.

It can be that source business data system 102 is a different version of target business data system 104, or that source business data system 102 is a completely different business data system than target business data system 104, all of these possibilities are contemplated herein.

In any case, source business data system 102 is shown coupled to a user device 106 that generates user interface displays 108 with user input mechanisms 110 that can be actuated by user 112 in order to control and manipulate source business data system 102. The user input mechanisms 110 can be any of a wide variety of different types of user input mechanisms. For instance, they can be dropdown menus, text boxes, icons, buttons, checkboxes, or other user actuatable input mechanisms. In addition, they can be actuated in a wide variety of different ways as well. Where speech recognition components are used, they can be actuated by speech commands. In addition, where the user interface displays 108 are displayed on a touch sensitive screen, they can be actuated by touch gestures (such as using the user's finger, a stylus, or another mechanism). In addition, they can be actuated using a point and click device (such as a mouse or track ball) using a hardware or soft keyboard, a keypad, a thumbpad, etc.

Source business data system 102 also illustratively includes a data source 114 with one or more source entity files 116. A source entity file 116 is illustratively a business record associated with an entity in source business data system 102. There are a wide variety of different types of entities, such as a customer entity that represents a customer, a vendor entity that represents a vendor, an invoice entity that represents an invoice, a product entity that represents a product, etc.

Target business data system 104 illustratively includes target data store 118 and staged data store 128. In addition, target business data system 104 illustratively includes target business data application 140 and processor 142. It will be noted, that while staged data store 128 and target data store 118 are both shown as part of target business data system 104, they could be separate or remote therefrom, and accessed by system 104, as well. In addition, while two data stores are shown with respect to target business data system 104, additional data stores could be used as well, or the two data stores could be combined into a single data store. Also, while staging system 120 and target system 132 are shown separate from target business data system 104 and source business data system 102, they could be part of either system as well.

In one embodiment, staging system 120 includes source-to-staging mapper component 122, source-to-staging component 124 and processor 126. Target system 132 includes staging-to-target mapper component 134, staging-to-target component 136 and processor 138.

Processors 126, 138 and 142 are illustratively computer processors with associated memory and timing circuitry (not separately shown). They are illustratively activated by, and facilitate the functionality of, other portions of the system to which they belong.

Before describing the overall operation of architecture 100 in more detail, a brief overview will be provided for the sake of clarity. When user 112 decides to migrate data in data source 114 to target data source 118 in target business data system 104, source-to-staging mapper component 122 illustratively generates a map 123 between the data in data source 114 and various staging tables (or other staging data structures) in staged data store 128. For instance, mapper 122 will illustratively generate a mapping between the data in source entity file 116 and data structures in staged data store 128. Source-to-staging component 124 then uses the map 123 to transfer data from source entity file 116 to the mapped data structures in staged data store 128. This results in the data from source entity file 116 being transferred to the tables or other structures in data store 128 as staged data 130.

Staging-to-target mapper component 134 then generates a mapping between the data structures in staged data store 128 that are storing staged data 130, and the data structures in target data store 118 that will eventually store the data from source entity file 116 as one or more target entity files 150. This is shown as map 135. Staging-to-target component 136 then accesses map 135 and transfers the staged data 130 to target data stores 118 and stores it in target entity files 150. Once this is complete, the target business data application 140 can be run on the target entity files 150, as desired by user 112.

Figure 2:
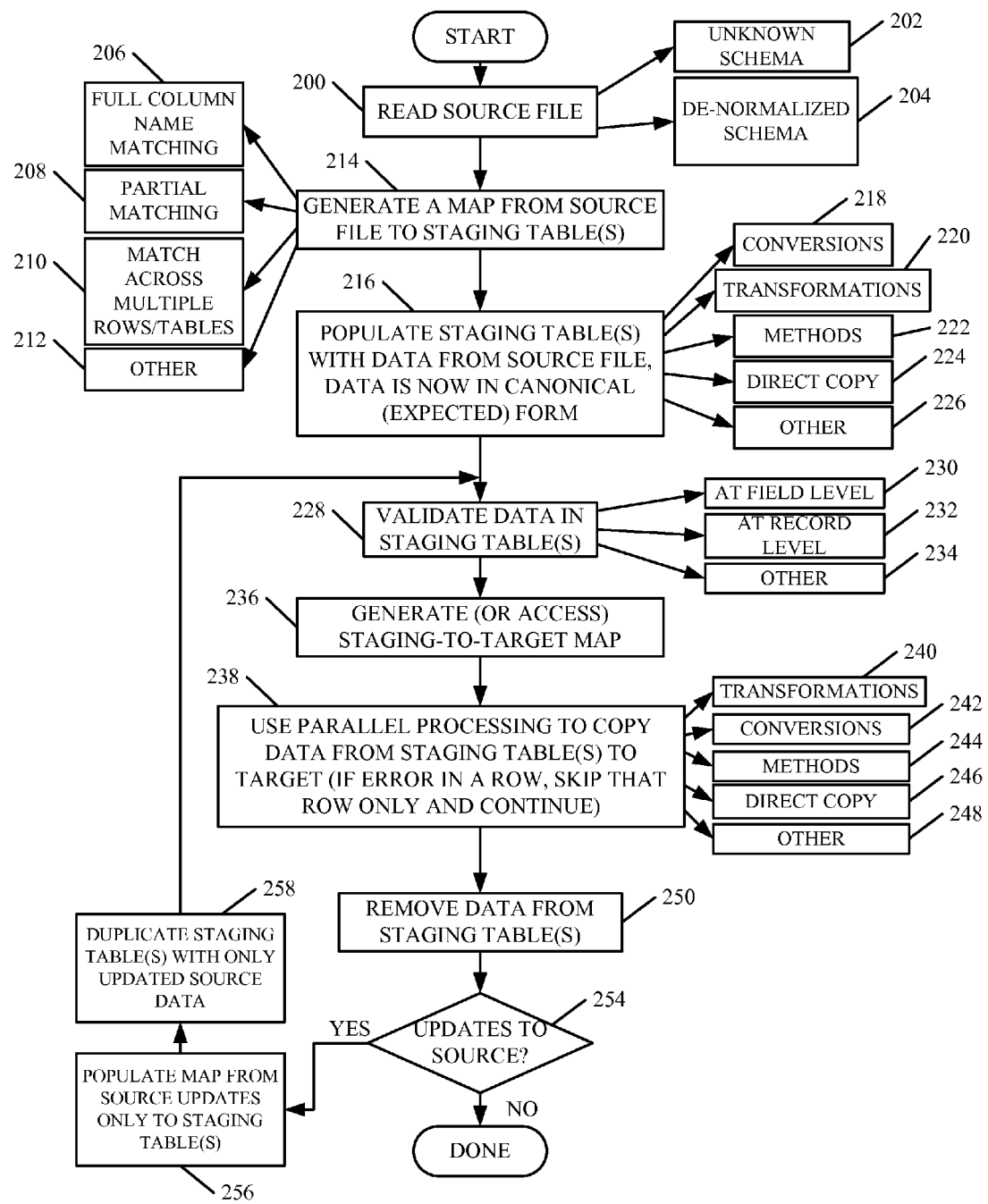
FIG. 2 is a flow diagram illustrating one embodiment of the overall operation of the architecture shown in FIG. 1.

FIG. 2 is a flow diagram illustrating one embodiment of the overall operation of architecture 100 in migrating data from source business data system 102 to target business data system 104. Source-to-staging mapper component 122 first reads source entity file 116. This is indicated by block 200 in FIG. 2. It will be noted that source entity file 116 can be formatted according to an unknown schema 202 and it can be a de-normalized (or an irregular) schema 204 as well. Similarly, as discussed briefly in the background section, the source of the data need not even be a business data system. Instead, it may simply be a database or another system. In any case, mapper component 122 reads source entity file 116.

Component 122 then generates map 123 that maps from source entity file 116 to one or more staging tables in staged data store 128. This can include a wide variety of different steps and matching techniques. In one embodiment, mapper component 122 maps existing columns in staged data store 128 against data in source entity file 116. In order to do this, mapper component 122 can map the names of the columns against the names of data in source entity file 116. Where the two names are fully matched, the source data corresponding to the matched name and the column in the staged data store 128 corresponding to the matched name are mapped to each other. This is indicated by block 206 in FIG. 2. Mapper component 122 also illustratively performs partial matching. For instance, if data has both a table name and a field name, mapper component 122 illustratively attempts to match both. Alternatively, the existing tables in staged data store 128 may break the table and field names found in source entity file 116 into two separate tables. In that case, the source data is matched to those two separate tables in staged data store 128. Partial matching and matching across multiple different rows in multiple different tables are indicated by blocks 208 and 210 in FIG. 2. Of course, other types of mapping techniques can be used as well, as indicated by block 212. For instance, if source entity file 116 has, a customer name and a customer address in the same column, mapper component 122 can illustratively recognize that those may be mapped to two different and separate tables in staged data store 128, and generate the mappings in that way as well. In any case, generating a map from the source file to the staging tables in staged data store 128 is illustratively indicated by block 214 in FIG. 3.

Once map 123 is generated by mapper component 122, source-to-staging component 124 retrieves data from source entity file 116 and populates one or more staging tables in staged data store 128 to obtain staged data 130. Because the source entity file 116 which is in an unknown format, has been transferred to the staging tables, the data is now in canonical (or expected) form. Populating the staging tables from the source data is indicated by block 216 in FIG. 2.

It will be noted that, during this process, source-to-staging component 124 can perform a variety of different processing operations as well. For instance, it can perform conversions 218 or transformations 220 on the source data, prior to storing it in the staging tables. It can invoke methods 222, or directly copy the data 224. Of course, it can perform other processing operations as well, and this is indicated by block 226.

Some examples of conversions, transformations, or other processing steps include converting a source file from a delimited file to a fixed file, or vice versa. That is, the source file may be a comma delimited file where the name and address (for example) are separated by commas. On the other hand, it can be a fixed file in which the first ten characters are reserved for the name and the next ten for the address, etc. Conversions or transformations can convert from one form to another, or to some other form. In addition, some systems have country codes that might be two letter codes, while others have three letter codes. These transformations can be made as well. Of course, a wide variety of other transformations or processing steps can be executed on the data as it is transferred from the source to the staging tables.

Once the data has been staged, it is validated in the staging tables. This is indicated by block 228 in FIG. 2. Validation can be performed in a variety of different ways as well. In one embodiment, it is performed at the field level 230, at the record level 232, or at another level 234. The staging-to-target component 136 illustratively validates the staged data against referential data that already exists in target business data system 104. That is, it can validate the staged data against the referential data to make sure that every field, column, etc., exists in the staging table.

Once the staged data 130 has been validated, staging-to-target component 136 either generates, or accesses, map 135, that maps the staging tables in staged data store 128 to records in target data store 118. Generating or accessing map 135 is indicated by block 236 in FIG. 2.

Component 136 then copies the staged data 130 from the staging tables in data store 128 to target data store 118. In the embodiment being discussed, the staged data 130 (which represents source entity file 116) is copied to one or more target entity files 150 in target data store 118. This is indicated by block 238 in FIG. 2.

It will be noted that target system 132 can begin copying staged data 130 from staged data store 128 to target data store 118, even as staging system 120 is still staging data into staged data store 128 from data source 114. This type of parallel processing can save time. It will also be noted that, if an error occurs in copying a given row, for instance, from staged data 130 to target entity files 150, that row is simply skipped and an error message or error data is generated for that row so that it can be displayed to a user to be remedied. However, this does not stop the entire process of migrating data. Instead, the rest of the data (that does not include errors) continues to be migrated.

During copying of staged data 130 to target data store 118, target system 132 can perform processing steps on the data as well. For instance, as with staging system 120, the processing steps can include transformation 240, conversion 242, invoking methods 244, direct copying 246, or other types of processing steps 248. It should also be noted that copying the staged data 130 from staged data store 128 to target data store 118 can be done in a wide variety of different ways as well. For instance, the inserts can be done row by row, or as sets or groups. The map can be read a single mapping at a time, or multiple mappings at a time, and the data migration can be performed accordingly.

Once the data has been successfully migrated to target data store 118, it is removed from the staged data store 128. This is indicated by block 250 in FIG. 2.

In one embodiment, if user 112 makes updates to source entity file 116, the entire data migration process need not be repeated. Instead, mapper component 122 simply generates a map from the updated information to staged data store 128, and only the updated data from source 114 is copied to the staging tables. The data is then validated and the updates are copied into target data store 118 as well. This is indicated by blocks 254, 256 and 258 in FIG. 2.

However, if no updates are performed, then processing is complete. This is also indicated by block 254.

In one specific embodiment, it may be that target business data system 104 is a cloud-based business data system. In that embodiment, the business data system may be hosted in a multi-tenant environment where the cloud-based business data system hosts data and the business data application for each of a plurality of different tenants, where each tenant corresponds to a different organization.

Figure 3:
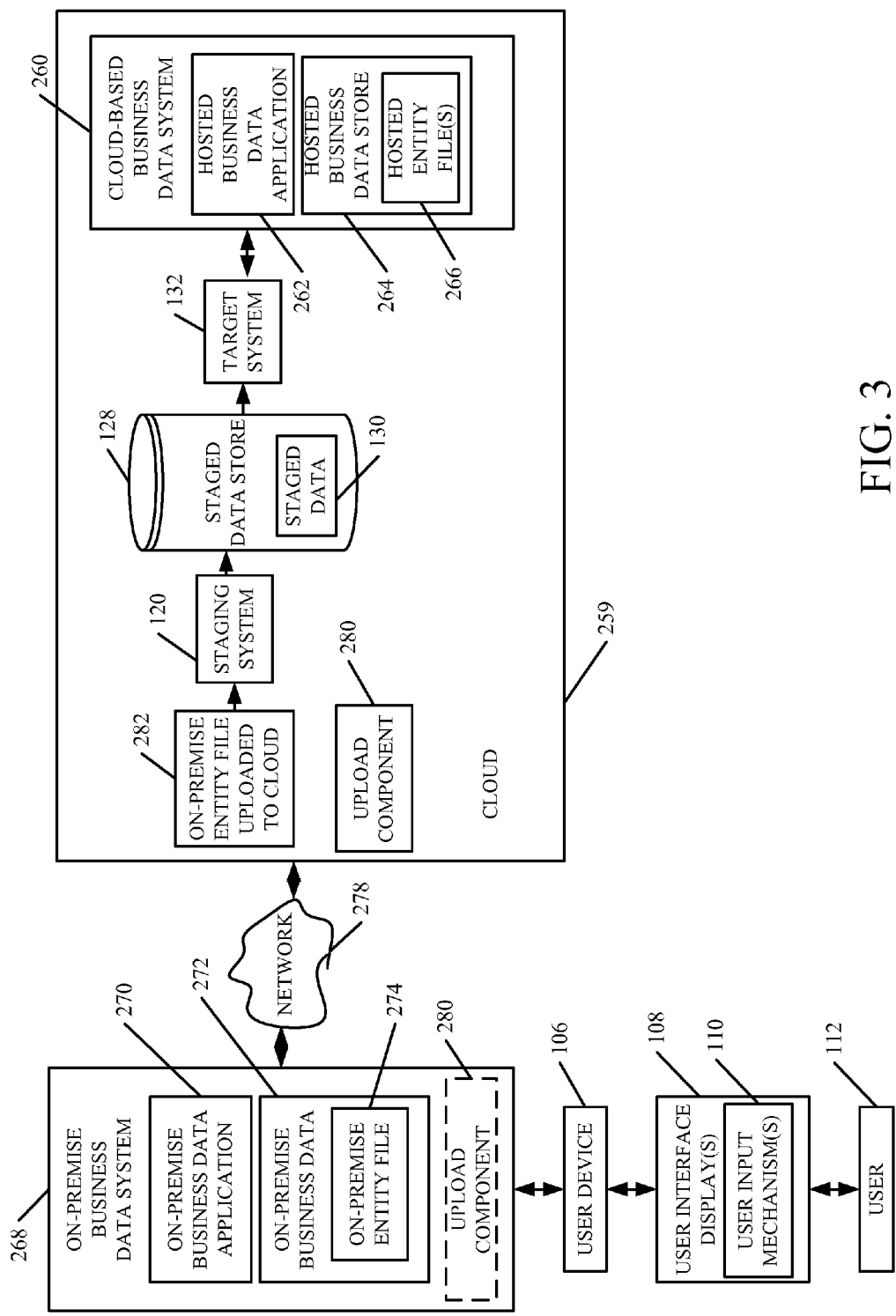
FIG. 3 is a block diagram showing a migration architecture for migrating data to a cloud-based business data system.

FIG. 3 shows a block diagram of one embodiment of a migration architecture for migrating data from an on-premise versions of a business data system to a cloud-based version of the business data system (or a cloud-based version of even a different business data system). Some of the items shown in FIG. 3 are similar to those shown in FIG. 1 and are similarly numbered.

It can be seen in FIG. 3, however, that instead of simply having a target business data system 104, that system is actually a cloud-based business data system 260. System 260 hosts a hosted version of a business data application 262 and target data store 118 corresponds to hosted business data store 264. Similarly, target entity file 150 corresponds to hosted entity file 266. Similarly, FIG. 3 shows that the source system 102 is defined as an on-premise business data system 268 that runs an on-premise business data application 270, which, itself, accesses on-premise data 272. Data 272 illustratively includes on-premise entity file 274, which comprises the source entity file that is to be migrated to hosted entity file 266. In the embodiment shown in FIG. 3, on-premise entity file 274 is migrated to hosted entity file 266 over network 278. An upload component 280 is shown either on cloud 259, or on on-premise business data system 268 (although it could be on both as well).

In the embodiment shown in FIG. 3, upload component 280 simply receives an identification of the data to be migrated to cloud 259. In this embodiment it is on-premise entity file 274. Upload component 280 thus uploads file 274 over network 278 to the cloud, where it is identified as on-premise entity file 282 that has been uploaded to the cloud. Then, the processing continues as described above with respect to FIG. 2. The data in file 282 is staged in staged data store 128 by staging system 120. It is then copied to the target system (cloud-based business data system 260) by target system 132. Thus, all of the processing for migrating the data (other than uploading the data file to the cloud) is performed on cloud 259.

Figure 4:
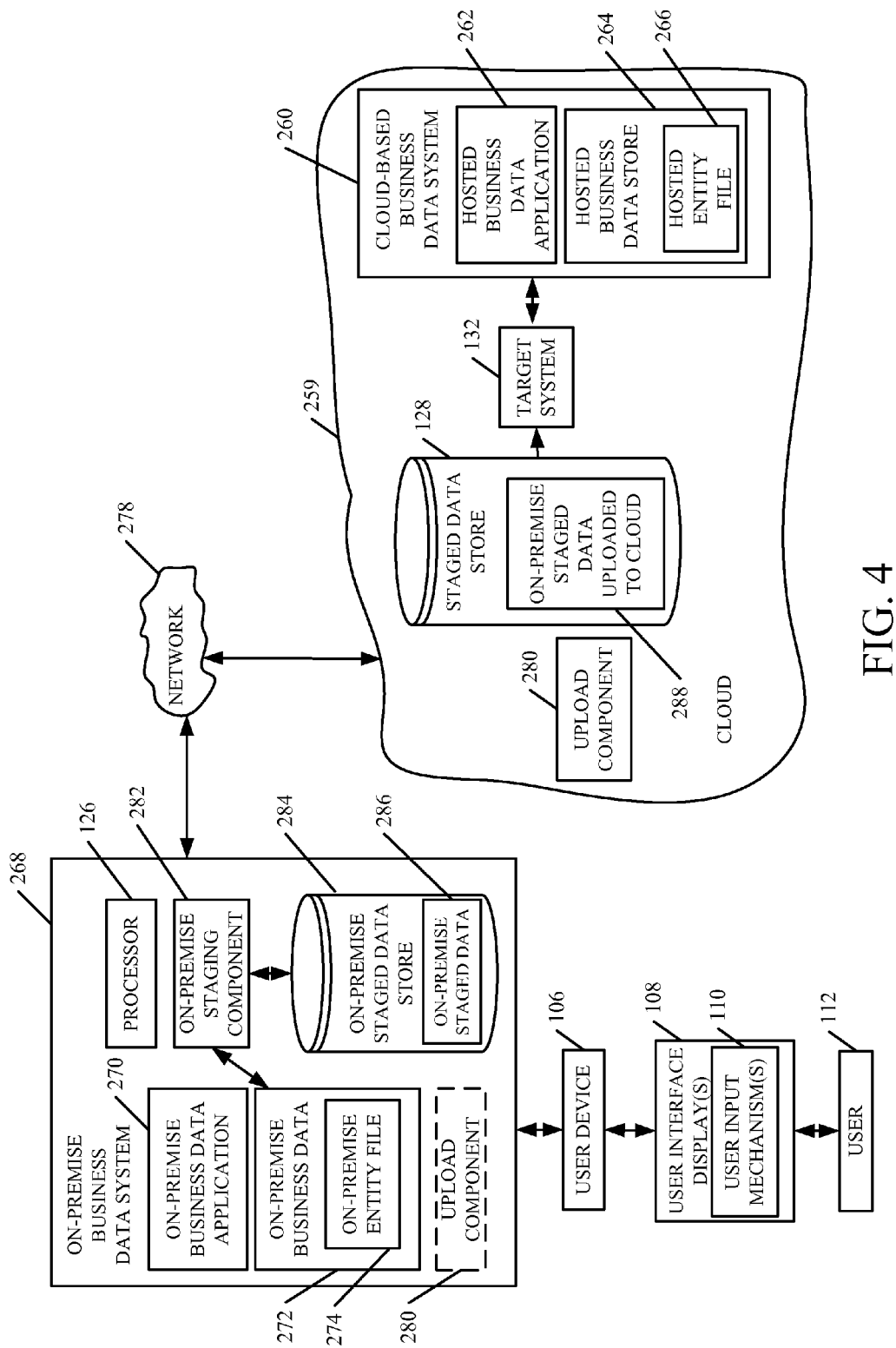
FIG. 4 is another block diagram of a migration architecture for migrating data to a cloud-based business data system.

FIG. 4 shows another block diagram of a migration architecture for migrating business data to cloud 259. Some of the items shown in FIG. 4 are similar to those shown in FIG. 3 and are similarly numbered. However, FIG. 4 shows that the staging is performed at the on-premise business data system 268. Therefore, an on-premise staging component 282 is first downloaded to on-premise business data system 268. It can be part of business data system 268 or separate therefrom. It is shown as part of the system for the sake of example only. Component 282 accesses on-premise entity file 274 and maps and transfers it to on-premise staged data store 284 as on-premise staged data 286. Upload component 280 then uploads the on-premise staged data into staged data store 128 on cloud 259. The data is shown as on-premise staged data 288. Processing then continues as normal, with target system 132 mapping and transferring data 288 from staged data store 128 to cloud-based business data system 260.

Figure 5:
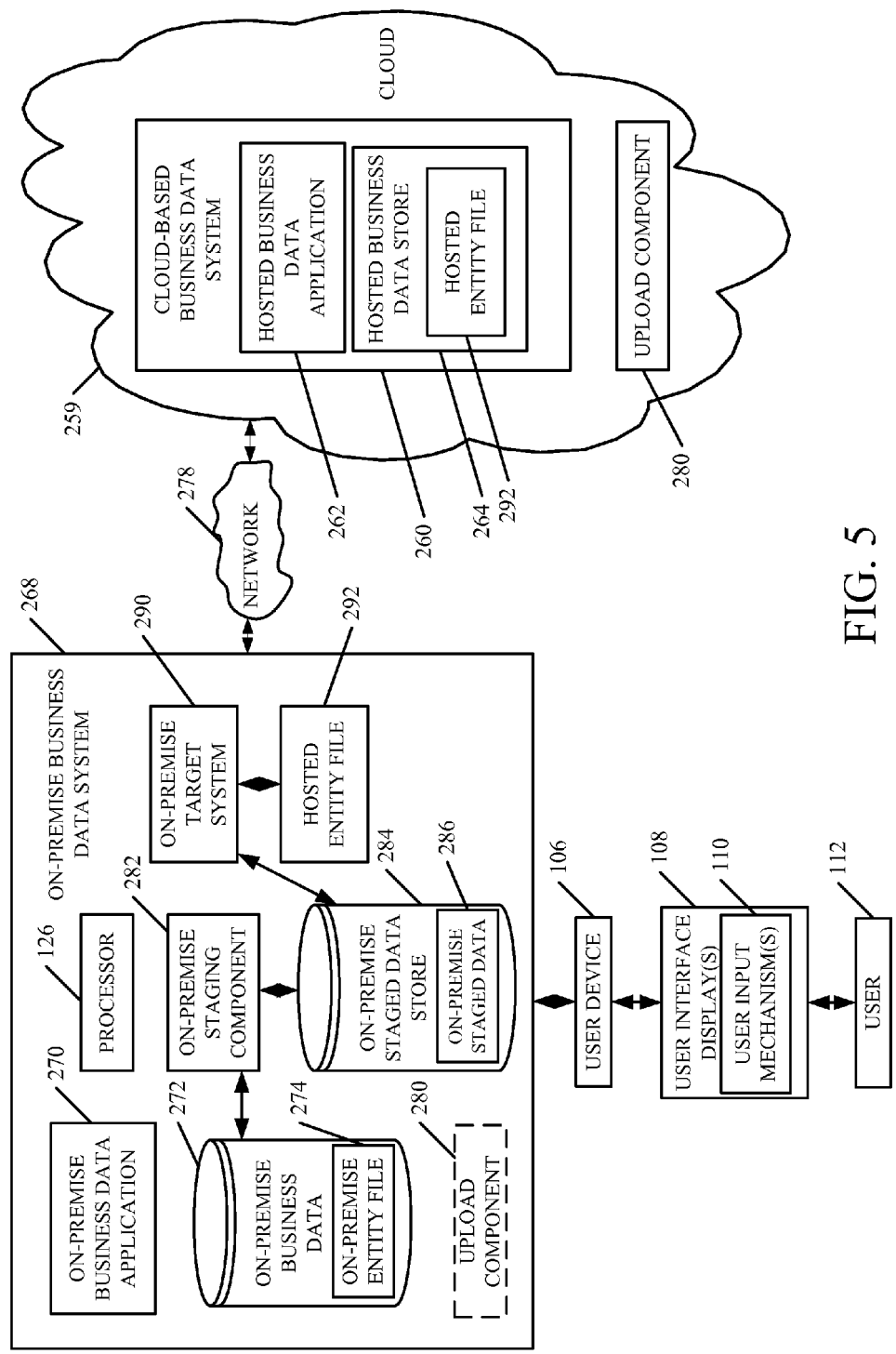
FIG. 5 is a block diagram showing another embodiment of a migration architecture for migrating data to a cloud-based business data system.

FIG. 5 shows yet another architecture. In FIG. 5, both staging and generating a target file are performed at the on-premise business data system, and the target file is simply uploaded over network 278 to cloud-based business data system 260, where it is stored in hosted business data store 264 as hosted entity file 266. A number of the items shown in FIG. 5 are similar to those shown in FIG. 4, and they are similarly numbered. However, FIG. 5 also shows that on-premise data system 268 also includes on-premise target system 290 that performs staging-to-target mapping and data migration to generate hosted entity file 292. This is all done as described above with respect to FIG. 2, except that it is done on-premise, at a tenant, instead of in cloud 259. Upload component 280 then simply uploads the hosted entity file 292 where it is placed in hosted business data store 264.

Figure 6:
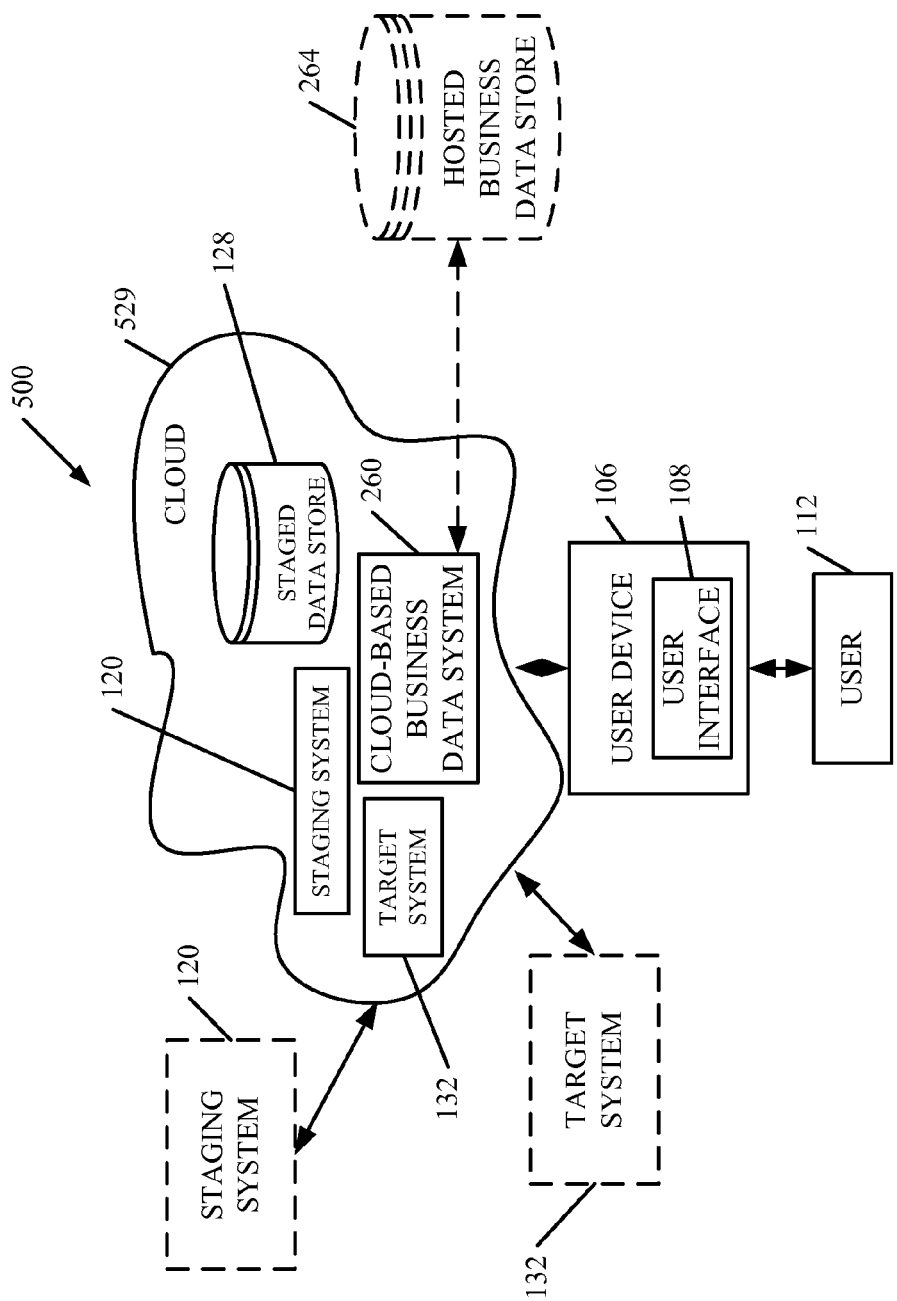
FIG. 6 shows more details of a cloud-based architecture.

FIG. 6 is a block diagram of portions of architecture 100, shown in FIG. 1, except that it is disposed in various ways in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in previous figures and they are similarly numbered. FIG. 6 specifically shows that portions of architecture 100 are located in cloud 502 (which can be public, private, or a combination where portions are public while others are private). Therefore, user 112 uses a user device 106 to access those systems through cloud 502.

FIG. 6 also depicts another embodiment of a cloud architecture. FIG. 6 shows that it is also contemplated that some elements of architecture system 100 are disposed in cloud 502 while others are not. By way of example, data store 264 can be disposed outside of cloud 502, and accessed through cloud 502. In another embodiment, staging system 120 or target system 132 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
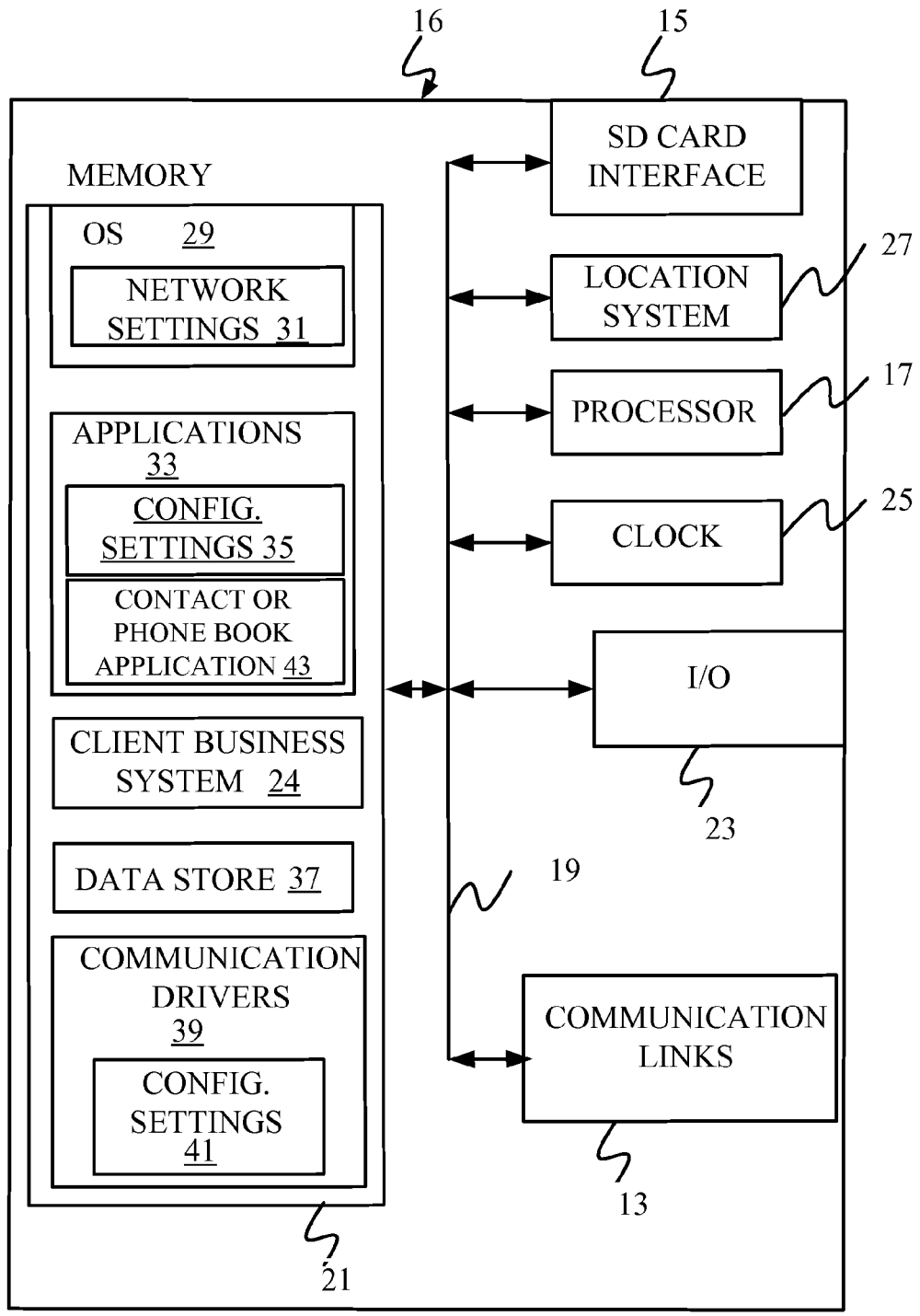
FIGS. 7-11 show various embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 102) are received on a removable Secure Digital (SD) card that is connected to a SD card interface 15. SD card interface 15 and communication links 13 communicate with a processor 17 (which can also embody processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 102 or the items in data store 104, for example, can reside in memory 21. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
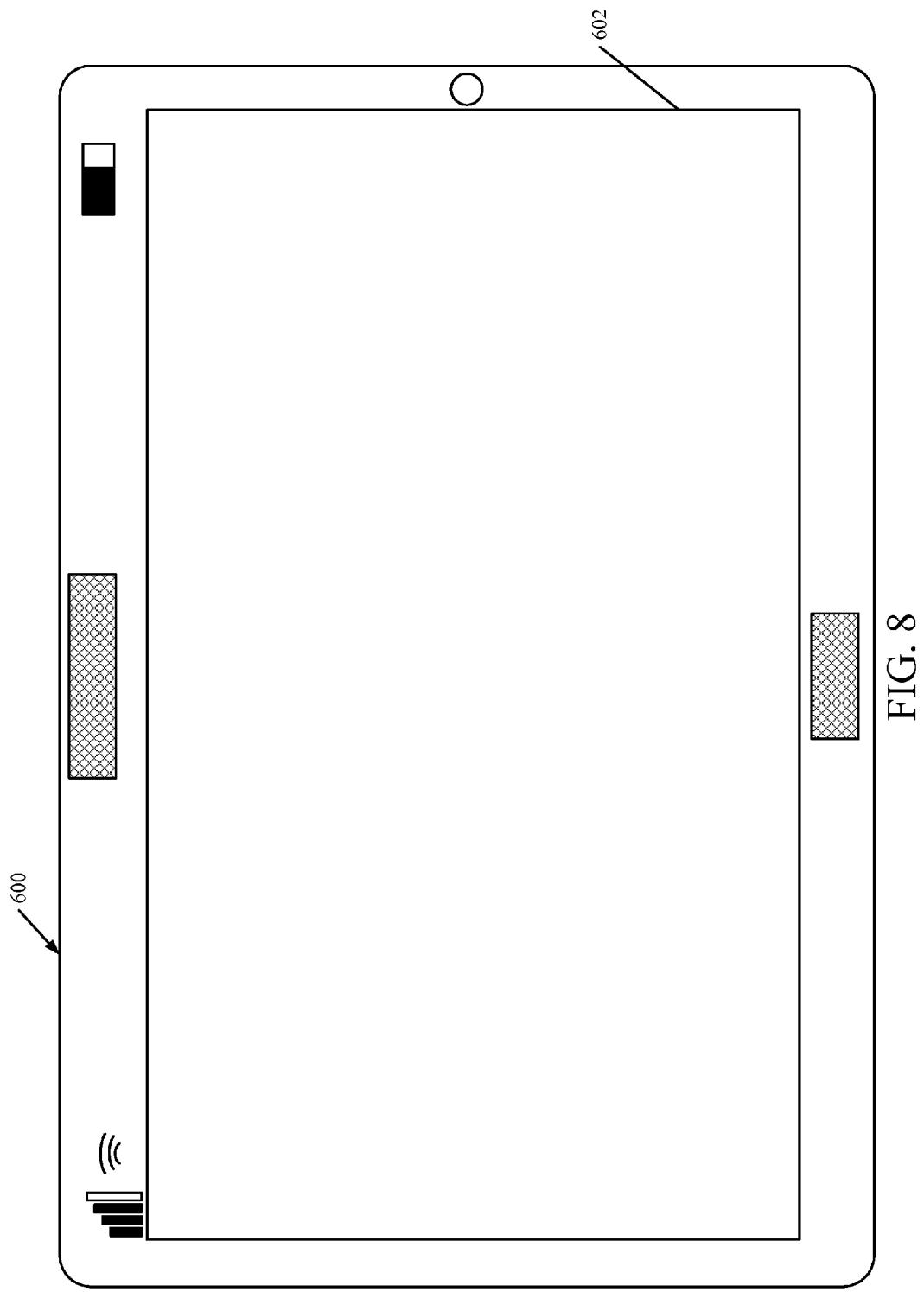

FIG. 8 shows one embodiment in which device 16 is a tablet computer 600. In FIG. 8, computer 600 is shown with display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
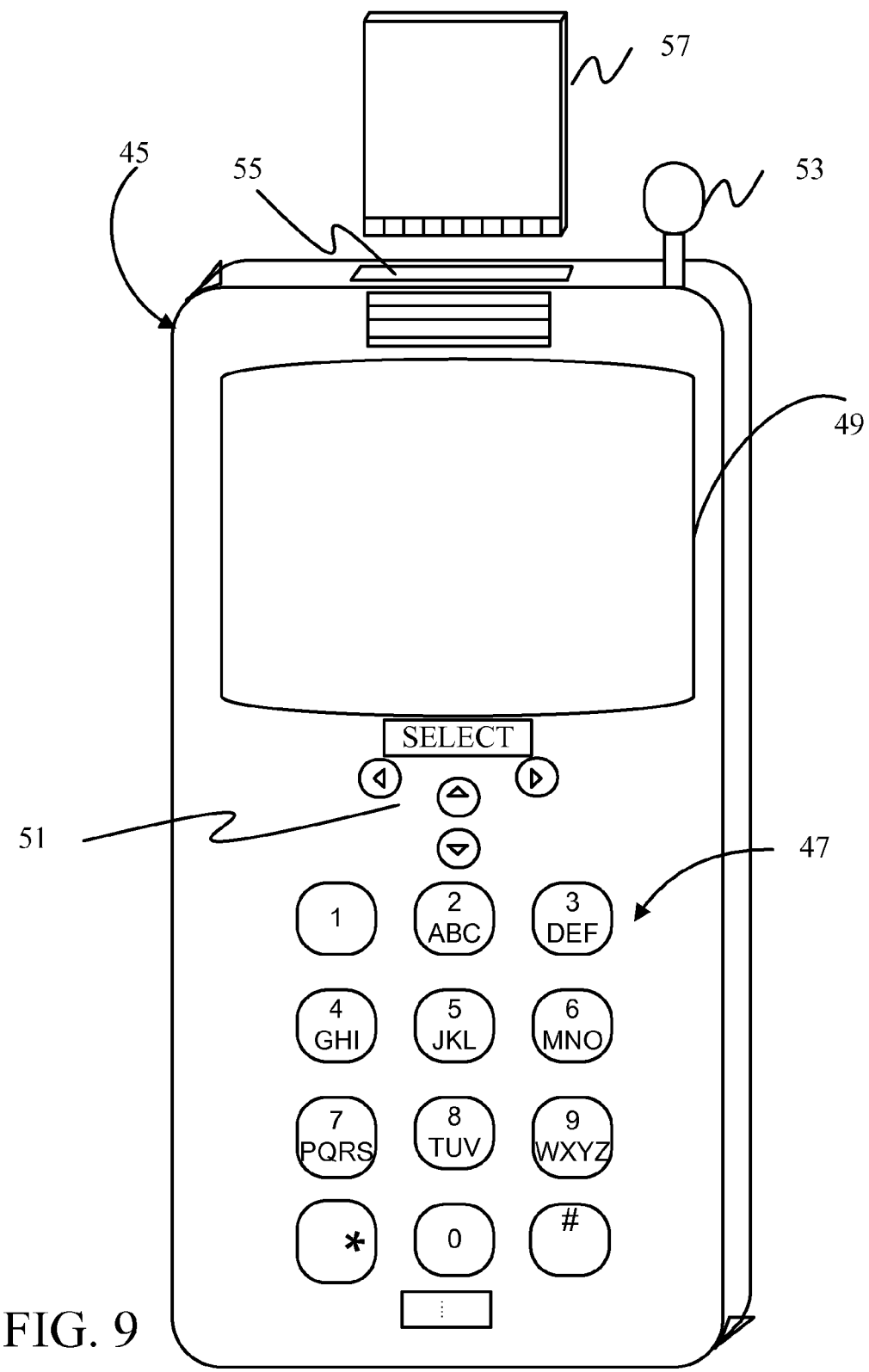
Figure 10:
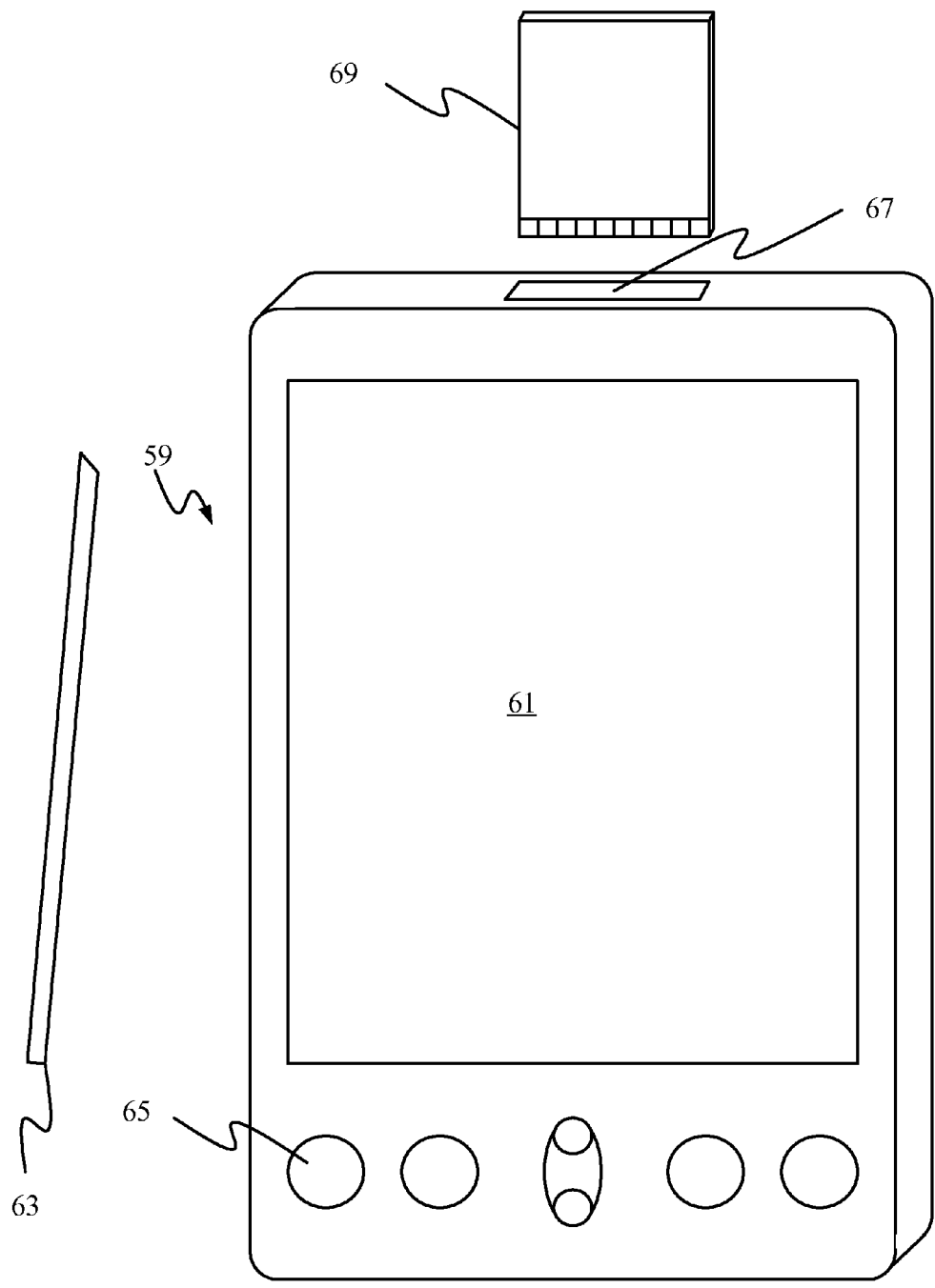

FIGS. 9 and 10 provide additional examples of devices 16 that can be used, although others can be used as well. In FIG. 9, a smart phone, or feature phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
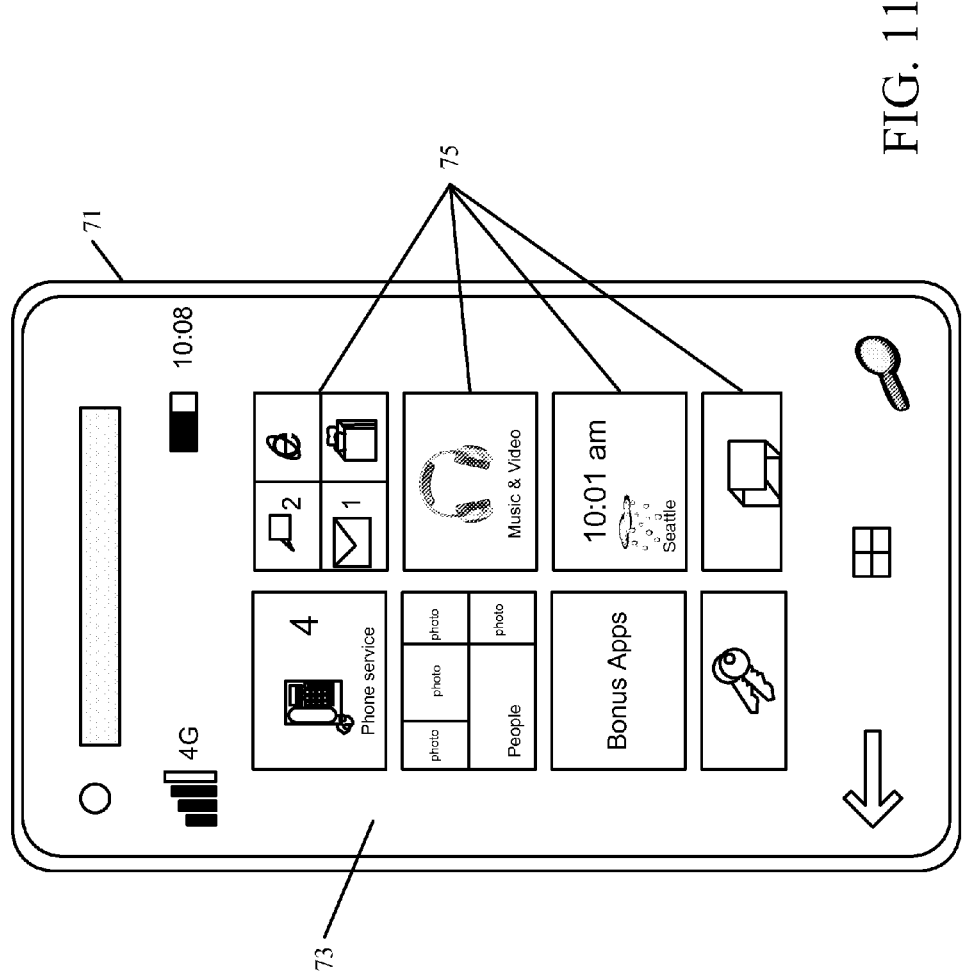

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
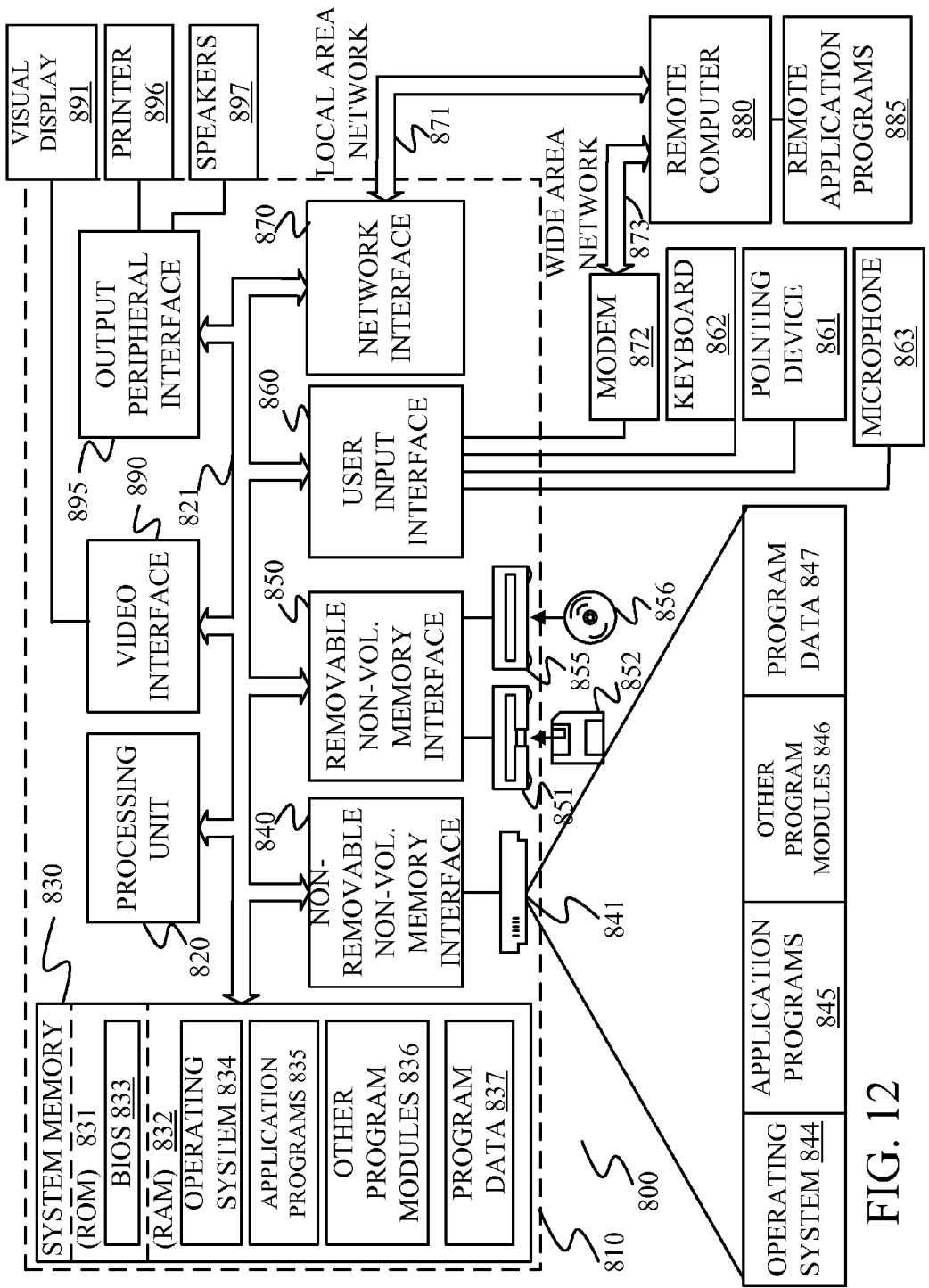
FIG. 12 is a block diagram of one illustrative computing environment.

FIG. 12 is one embodiment of a computing environment in which architecture 100 (for example), or portions of it, can be deployed. With reference to FIG. 12, an exemplary system for implementing some embodiments includes a general-purpose computing device in the form of a computer 810. Components of computer 810 may include, but are not limited to, a processing unit 820 (which can comprise the processors discussed above), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Array (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of migrating data, comprising:
   identifying data in a source data system instance, the identified data comprising non-canonical data;
   generating a staging mapping that maps data from a first number of tables in the identified data to a second number of tables in the staging data structure, the first and second numbers being different from one another; and
   in parallel,
   saving a first subset of the identified data from the source data system instance to the staging data structure according to the staging mapping, wherein the first subset of data is saved to the staging data structure in a canonical form; and
   copying a second subset of the identified data from the staging data structure to a target data system instance.

2. The computer-implemented method of claim 1 wherein the source data system instance comprises a source business data system instance, and wherein the identified data comprises identified business data, and further comprising:
   verifying the data in the staging data structure.

3. The computer-implemented method of claim 2, wherein the target data system instance comprises a target business data system instance, and further comprising:
   generating a target mapping between the staging data structure and the target business data system instance, and wherein saving comprises saving the identified business data the staging data stricture to the target business data system according to the target mapping.

4. The computer-implemented method of claim 3 wherein identifying data in a source data system instance comprises:
   identifying business data in an on-premise business data system instance.

5. The computer-implemented method of claim 4 wherein saving the identified business data from the staging data structure to the target business data system comprises:
   saving the identified business data from the staging structure to a cloud-based business data system instance.

6. The computer-implemented method of claim 5 wherein generating a staging mapping comprises:
   uploading the identified business data to a cloud-based business data system; and
   generating the staging mapping, at the cloud-based business data system, between the identified business data and a staging data structure at the cloud-based business data system.

7. The computer-implemented method of claim 6 wherein saving a first subset of the identified data comprises:
   storing the identified business data to the staging data structure in a cloud-based staging data store.

8. The computer-implemented method of claim 3, wherein saving the identified business data from the staging data structure to the target business data system comprises:

saving the identified business data from the staging data structure to a multi-tenant data center that stores data for a plurality of different tenants, each tenant corresponding to a different organization.

9. The computer-implemented method of claim 3 and further comprising:
    downloading the staging mapping to an on-premise version of the source business data system instance.

10. The computer-implemented method of claim 2 wherein verifying the data in the staging data structure comprises:
    performing field level verification on the data in the staging data structure.

11. The computer-implemented method of claim 2 wherein verifying the data in the staging data structure comprises:
    performing record level verification on the data in the staging data structure.

12. The computer-implemented method of claim 2 wherein generating a staging mapping comprises:
    matching column names in the identified business data against column names in the staging data structure to identify mappings.

13. The computer-implemented method of claim 12 wherein matching comprises:
    partially matching the column names in the identified business data against the column names in the staging data structure to identify the mappings.

14. The computer-implemented method of claim 2, and further comprising:
    identifying updates made to the identified business data in the source business data system instance;
    updating the staging mapping from the updates to the identified business data, only, to the staging data structure; and
    storing the updates to the identified business data, only, to the staging data structure.

15. A data migration system, comprising:
    a source-to-staging mapper component configured to:
        read a non-canonical data file in an instance of a source data system, including at least first and second subsets of data; and
        generate a map that maps a first number of tables in the non-canonical data file to a second number of tables, different from the first number of tables, in a canonical staging data structure; and
    a data processing component configured to, in parallel,
        populate, based on the map, the canonical staging data structure with the first subset of data from the non-canonical data file, using a computer processor; and
        copy the second subset of the data from the canonical staging data structure to an instance of a target data system.

16. The data migration system of claim 15 wherein the instance of the source data system comprises an instance of a business data system, and the instance of the target data system comprises an instance of a target business data system, the data migration system further comprising:
    a staging-to-target mapper component configured to generate a second map that maps the canonical staging data structure to the target business data system; and
    a staging-to-target component configured to validate the data in the canonical staging data structure and copy the data from the canonical staging data structure to the target business data system based on the second map.

17. A computer readable storage medium that stores computer readable instructions which, when executed by a computer, cause the computer to perform a method, comprising:
    obtaining data from an on-premise source data system instance, the obtained data comprising non-canonical data;
    obtaining a staging mapping that maps data from a first number of tables in the on-premise source data system instance to a second number of tables in the staging data structure, the first and second numbers being different one another;
    generating a package including an indicator indicating the obtained data and the staging mapping; and
    in parallel based on the package,
        saving a first subset of the obtained data from the source data system instance to the staging data structure according to the staging mapping, wherein the obtained data is saved to the staging data structure in a canonical form; and
    copying a second subset of the obtained data from the staging data structure to a cloud-based version of the on-premise source date system instance.

18. The computer readable storage medium of claim 17, wherein the on-premise source data system instance comprises an on-premise business data system instance and wherein the cloud-based version comprises a multi-tenant data center that hosts business data for a plurality of tenants, each tenant corresponding to a different organization, and wherein obtaining data from the on-premise source data system instance comprises:
    obtaining a data file from the on-premise business data system instance;
    reading the data file; and
    identifying business data to be migrated from the data file to the multi-tenant data center.

* * * * *